Aug. 6, 1968 K. ACKERMANN ETAL 3,395,871

CARTRIDGE RECEIVING MEANS FOR A TAPE RECORDER

Filed May 24, 1966 4 Sheets-Sheet 1

Inventors:
Karl Ackermann
Klaus Paape
By: Spencer & Kaye
Attorneys

Aug. 6, 1968 K. ACKERMANN ETAL 3,395,871

CARTRIDGE RECEIVING MEANS FOR A TAPE RECORDER

Filed May 24, 1966 4 Sheets-Sheet 2

Inventors:
Karl Ackermann
Klaus Paape
By: Spencer & Kaye
Attorneys

CARTRIDGE RECEIVING MEANS FOR A TAPE RECORDER

Filed May 24, 1966 4 Sheets-Sheet 3

Inventors:
Karl Ackermann
Klaus Paape
By: Spencer & Kaye
Attorneys

CARTRIDGE RECEIVING MEANS FOR A TAPE RECORDER

Inventors:
Karl Ackermann
Klaus Paape
By: Spencer & Kaye
Attorneys

United States Patent Office 3,395,871

Patented Aug. 6, 1968

3,395,871

CARTRIDGE RECEIVING MEANS FOR A TAPE RECORDER

Karl Ackermann and Klaus Paape, Berlin, Germany, assignors to Robert Bosch Elektronik und Photokino G.m.b.H., Berlin-Wilmersdorf, Germany Filed May 24, 1966, Ser. No. 552,505
Claims priority, application Germany, July 3, 1965, B 82,676
8 Claims. (Cl. 242—55.13)

ABSTRACT OF THE DISCLOSURE

A tape recorder for use in motor vehicles which is adapted to receive tape cartridges which the driver can easily exchange without moving from his seat. The tape recorder includes a housing and driving means for a tape cartridge. A tape cartridge receiving means is provided in the housing. The receiving means can be raised from a basic operating position to a non-operating position by means of a lever actuated from outside thereof. An ejector means within the receiving means then pushes the tape cartridge a small distance out of the receiving means thereby allowing it to be easily removed. When a tape cartridge is inserted into the receiving means, the movement of the cartridge against the ejector means causes the receiving means to be automatically lowered to the basic operating position by the pull of a spring provided for this purpose.

The present invention relates to tape recorders and more particularly to tape recorders which may be used in motor vehicles.

Tape recorders of this type are generally equipped with a horizontally arranged receiving means adapted for receiving a laterally introducible cartridge containing the tape, with the arrangement being such that the centers of the tape reels are coupled with the driving means of the tape recorder after the cartridge has been inserted. Such tape recorders must be constructed in such a manner that they can be easily and comfortably operated when positioned in a motor vehicle. It is for this reason that the individual tapes are accommodated in cartridges so that the driver can easily insert the cartridge into the tape recorder or remove it therefrom without having to move from his seat.

In one type of tape recorder suitable for use in motor vehicles, the cartridge is slipped into a slot below the dashboard and comes to lie in a receiving chamber. During the last part of the movement of the cartridge into the receiving chamber, the spring force of an ejector spring has to be overcome, the ejector spring being arranged at the front end of the cartridge with respect to the direction in which the cartridge is inserted for ejecting the cartridge. Once the cartridge has been completely inserted, it is pressed downwardly by means of pressure exerting springs which are arranged at the top of the receiving chamber, whereupon the cartridge falls to the bottom of the receiving chamber which lies at a somewhat lower level than the lower edge of the slot through which the cartridge is inserted. Consequently, the cartridge is not free to leave the receiving chamber inasmuch as the rear end of the cartridge, with respect to the direction in which the cartridge is introduced, is held behind a strap or similar member which lies in the plane of the slot and forms the lower limit thereof. After the cartridge is secured within the receiving chamber, the driver has to push a button in order to bring the driving mechanism of the tape recorder into engagement with the center of the tape reels.

For removal of the cartridge, the driver must reach into the narrow slot behind which the cartridge lies and must pick up the cartridge by a handle which itself is very small and which also lies behind the slot so as to raise up the cartridge. In this way, the slot-side end of the cartridge comes to lie above the aforementioned strap and the cartridge is then moved a certain distance out of the receiving chamber under the influence of the ejector spring which is arranged at the other end of the cartridge. The driver can thus now grasp the cartridge and exchange it for another.

Experience has shown that this type of arrangement is not very suitable, particularly, if it is borne in mind that the driver will often wear gloves so that the exchange of cartridges becomes a rather awkward and cumbersome operation, chiefly because the small handle of the cartridge is difficult to reach and almost inaccessible. Thus, it generally takes several attempts before the driver can manage to raise up the cartridge into the desired position.

It is, therefore, the primary object of the present invention to provide a tape recorder arrangement which overcomes the above drawbacks, namely, to provide a tape recorder which is, preferably, suitable for mounting below the dashboard of a motor vehicle, which tape recorder is adapted to receive tape cartridges which the driver can readily exchange, comfortably without moving from his seat.

With the above object in view, the present invention resides, basically, in a tape recorder arrangement in which the receiving means can be raised up from its basic operating position by means of a lever which is actuatable from the outside, there being an ejector means within the receiving means for pushing the cartridge therein, a small distance out of the receiving means so that it may be easily removed. Conversely, in accordance with the present invention, when a cartridge is inserted into the receiving means, the movement of the cartridge against the ejector means causes the receiving means to be lowered in the basic operating position.

Additional objects and advantages of the present invention will become apparent upon consideration of the following description when taken in conjunction with the accompanying drawings in which.

Figure 1:
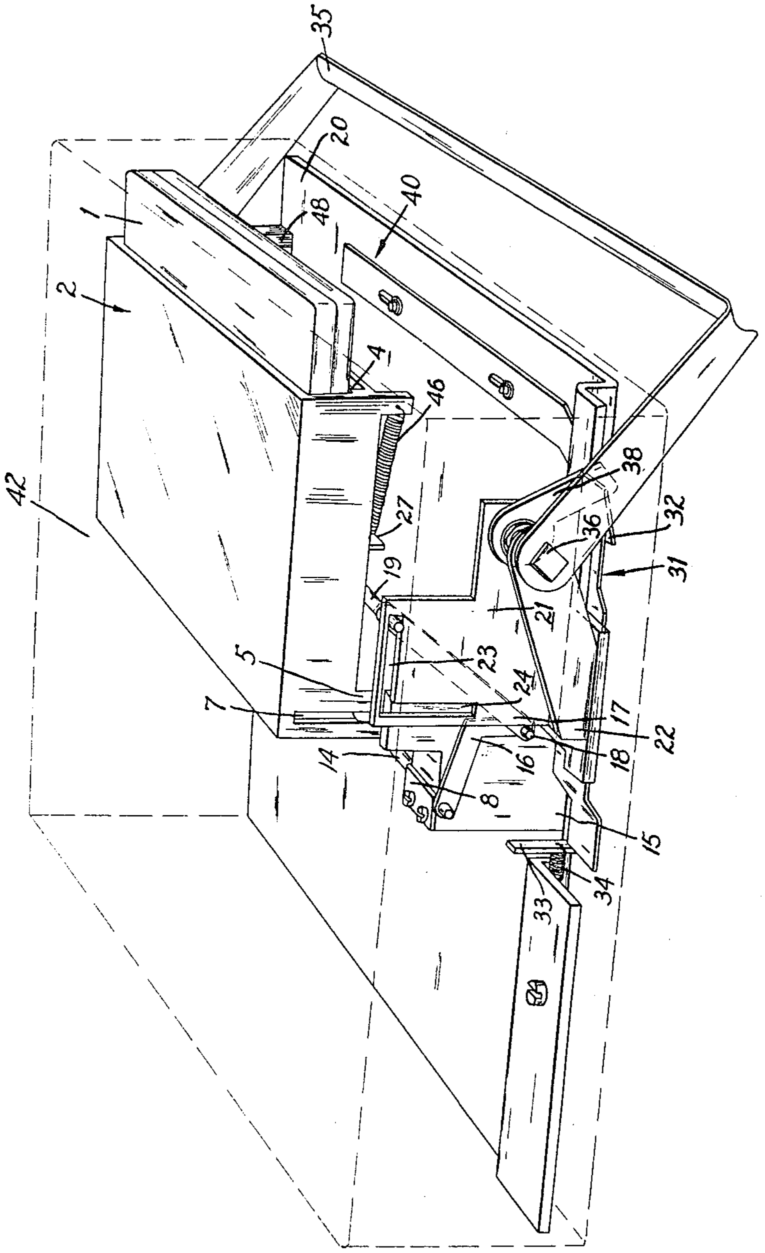
FIGURE 1 is a perspective view showing the apparatus according to the present invention, with the tape recorder being shown in dashed lines and the receiving means being shown in the raised position and having a tape cartridge extending out therefrom.

Referring now to the drawings, there is shown in dashed lines, a generally block-shaped housing 42 within which the tape recorder is arranged and a chassis 20 disposed within this housing and having the apparatus according to the present invention mounted thereon. As shown in FIGURE 1, there is provided a receiving means 2 which can be raised and lowered and which defines a chamber for receiving a cartridge 1, this chamber being bounded by a large upper and a large lower wall, as well as a left and right side wall, with the front and rear of the receiving means being opened.

Each of the side walls of the receiving means 2 has at its rear end a downwardly-directed extension 5 and 6, respectively, which extension, when the receiving means are in the lowered position, reaches to the chassis 20. The extensions are each provided with a longitudinal slot, the slot 7 being clearly shown in FIGURES 1 and 2 in the extension 5 of the left side wall of the receiving means. Two guide tongues 10 and 11 project into the slot, and are fixedly anchored in a mounting block 8 arranged on the left side of the chasis, the positioning of these tongues being more clearly shown in FIGURE 4. The extension 6 of the right side wall of the receiving means is coupled to a mounting block 9, in a manner similar to that in which the extension 5 is coupled to the mounting block 8, in that two guide tongues of the block 9 extend into the slot of the extension 6.

Figure 2:
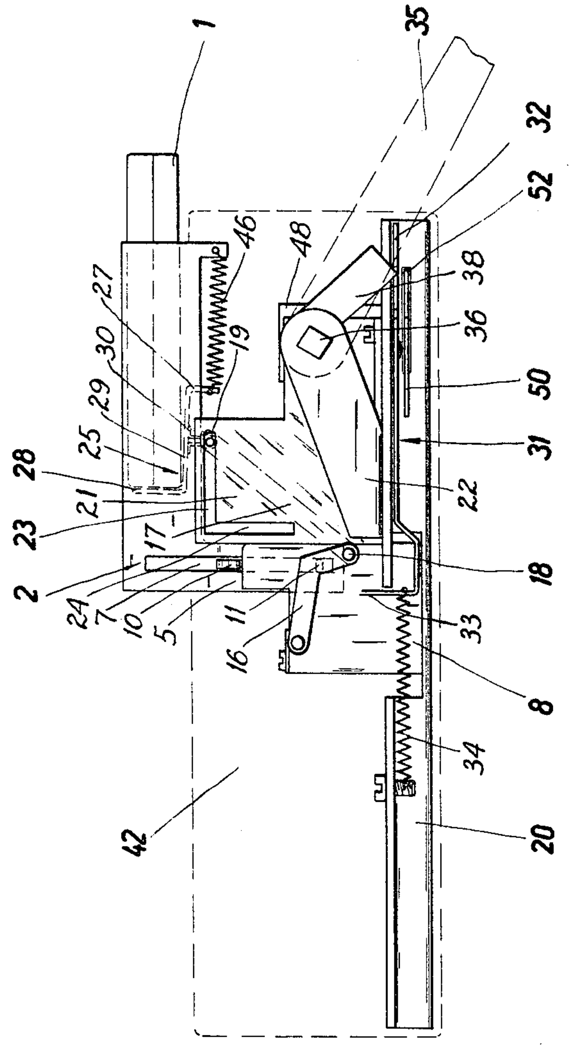
FIGURE 2 is a left-side view of the tape recorder shown in FIGURE 1.
Figure 3:
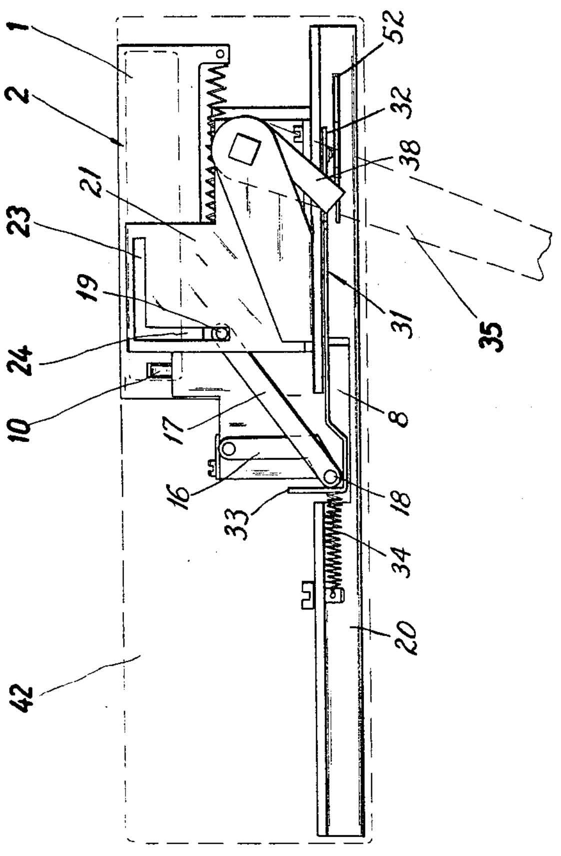
FIGURE 3 is a left-side view of the apparatus shown in FIGURE 1, with the receiving means being shown in the lowered position.
Figure 4:
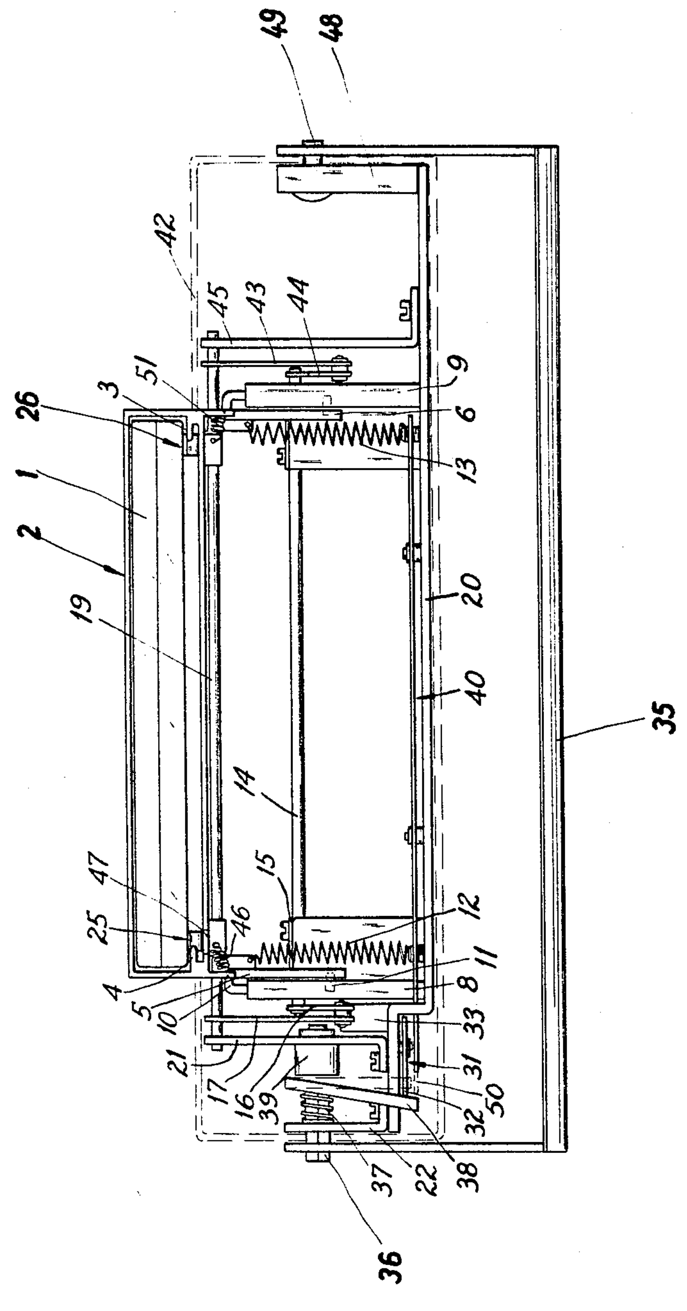
FIGURE 4 is a front view of the apparatus according to the present invention with the receiving means being in the raised position.

Thus, the receiving means 2 can only be moved in a vertical direction, namely, between the raised position illustrated in FIGURE 2 and the lowered position shown in FIGURE 3. As shown in FIGURE 4, two tension springs 12 and 13 are arranged with their lower ends hooked to the chassis 20 and with their upper ends hooked to a portion of the receiving means, such that these springs serve to continuously urge the receiving means 2 into the lowered position.

At the upper side of the rear, wider portion of the left mounting block 8, there is provided a groove (not visible) in which a shaft 14 is, as shown in FIGURES 1 and 4, rotatably mounted by means of a screw-fastened cover plate 15, this shaft extending to the right mounting block 9. The right end of the shaft is similarly mounted in the upper rear portion of the righthand mounting block 9. Arranged near the outer surface of the mounting block 8 and extending parallel thereto, is a lever linkage comprising two levers 16 and 17 which are pivotably connected to each other by means of a pivot pin 18. As shown in the drawings, the lever 16 is formed from an angled member whereas the lever 17 is formed from a straight member. The end of the angled lever 16 leading to the shaft 14 is fixedly connected with the left end of this shaft and the upper end of the straight lever 17 is fixedly connected with the left end of a rod 19, these fixed connections being formed, for example, by soldering. Arranged near the right mounting block 9, there is a further set of levers 43, 44, which are similar to the levers 16 and 17, the angled lever 44 having one end fixedly connected with the right end of the shaft 14 and the straight lever 43 being fixedly connected with the right end of the rod 19. In this way, any force acting on any part of one of the lever linkages is transmitted in the same direction to the other lever linkage.

As further shown in FIGURE 1, a flat slide 31 which is forwardly and rearwardly displaceable is mounted at the lower surface of the left edge of the chassis 20, this slide being provided with an upwardly bent portion. A helically bent return spring 34 is connected to the slide 31 for rearwardly biassing the slide into its rearward position shown in FIGURE 1, with the slide being moved to its forward position, shown in FIGURE 2, in a manner to be described below. A lug 33 which is arranged at the rear end of the slide and which is bent upwardly, presses against the lever linkage 16, 17 as shown in FIGURE 3, at the place where the two levers are connected to each other by means of the pivot pin 18. The straight lever 17 can only react to this pressure by forcing the fixedly connected left end of the rod 19 vertically upwardly in a vertical slot-like guide channel 24 which communicates with a horizontal guide channel 23, these channels being provided in a vertical leg of an upwardly-extending angle member 21 which is fastened to the chassis 20 by screws. As explained above, the force acting on the left side of levers 16, 17 is transmitted by the shaft 14 and the rod 19 to the right-hand set of levers 43, 44, so that the right end of the rod 19 will also move in the vertical section of a slot-like guide channel (not visible) of an angle member 45, when the slide 31 is moved in the forward direction. In any event, the rod 19 will, initially, move upwardly in the direction parallel to itself.

The rod 19 is arranged below the lower wall of the receiving means 2 and determines the elevational position of the receiving means inasmuch as the tension springs 12, 13, pull the receiving means toward the chassis 20, and therefore, also toward the rod 19. Also connected with the rod are two identical ejector mechanisms 25 and 26, of which the left ejector 25 is shown in dashed lines in FIGURE 2. As shown, the ejector 25 is formed with bends and is made from a strip material having an upwardly directed bent portion 28 which can assume a position behind the cartridge 1, a horizontal intermediate portion 29 having at the lower surface thereof a loop 30 secured thereto, for example by welding for carrying along the rod 19, and a downwardly-directed bent portion 27 to which the rear end of a tension spring 46 is connected. The left ejector can, with its intermediate portion 29, move in a slot 47 whose cross section is shown in FIGURE 4, this slot being provided in the lower large wall of the receiving means near the left-hand narrow side wall thereof, considered in the direction in which the cartridge 1 is inserted. The right-hand ejector 26 is similarly movable in another slot provided in the lower wall of the receiving means.

Thus, when the set of levers 16, 17, is pressed forwardly by the lug 33 of the slide 31, as a result thereof, the left end of the rod 19 is raised up to the upward end of the vertical section 24 of the guide channel in the angle member 21 and the rod will thereafter be pulled forwardly by the tension spring 46. This movement occurs because the left end of the rod is now free to move in the horizontal section 23 of the guide channel and is no longer prevented from moving forward by the right flank of the vertical section 24. The same type of movement, due to the connecting linkages, occurs in the right-hand set of levers 43, 44, and the elements operatively associated therewith.

As a result of the forward movement of the rod 19, the ejectors 25 and 26 will also be carried along and moved forwardly, thus pushing the cartridge 1 out of the receiving means 2 by a predetermined distance, into the position shown in FIGURES 1 and 2. Here, the cartridge does not lie directly on the lower large wall of the receiving means 2, but slides along guide rails 3 and 4, as shown in FIGURE 4, which guide rails extend along the inner surfaces of the two side walls of the receiving means in the direction in which the cartridge is inserted, thus facilitating the removal of this cartridge.

If a new cartridge 1 is then placed into the receiving means 2 and pushed against the ejectors 25 and 26, the force applied will overcome the force of the tension springs 46 and 51 such that the new cartridge will be pushed to the rear, with the ejectors being forced backwardly, and carrying along the rod 19 via the two carry-along loops 30, the ends of the rod being guided in the horizontal guide channels 23. When, finally, as a result of this forced movement under the influence of the cartridge, the ejectors reach the rear end of the receiving means, (this being the left end of the receiving means as viewed in FIGURE 2), and the ends of the rod 19 abut against the rear end of the horizontal section 23 of the slot-like guide; in this position, the two tension springs 12 and 13 jerk the receiving means 2 down, into the position shown in FIGURE 3. In accordance with the present invention, as a result of this downward movement, the centers of the tape reels in the cartridge will automatically come into engagement with the driving means of the tape recorder (not shown).

Referring again to FIGURE 1, the slide 31 has, in addition to the lug 33 at one end, a hook-like projection 32 at the other end, this projection being displaceable behind a latch 38. The latch 38 is coupled with a carrying handle 35 and is, in this manner, always made pivotable together with this handle, This pivotable arrangement is attained by having the left arm of the carrying handle and also the latch fit, by means of respective square holes onto an axle 36 of square cross section, this axle being mounted on angle members 21 and 22 which are screw-fastened onto the chassis 20. The right arm of the carrying handle is, as shown in FIGURE 4, rotatable about a pin 49 mounted in a block 48. The latch 38 is biassed by a helical pressure spring 37 against a sleeve 39 which is also mounted on the square axle 36 and therefore, the free end of the latch has a tendency to point downwardly, as shown in dashed lines in FIGURE 4. However, the square hole of the latch has walls which are bevelled so that the latch can also assume the position shown in solid lines in FIGURE 4 when a pressure from the right is exerted on the lower end.

FIGURE 3 shows the receiving means as occupying its basic operating position, that is to say, when the receiving means are in the lowered position in the housing 42 so that the receiving means have a flush upper surface with the housing. In FIGURE 3, the latch is positioned behind the back of the hook-shaped projection 32 of the slide 31 and the carrying handle is in a position in which it is downwardly directed through a small angle and therefore occupies a downward position.

In operation, when the driver of the vehicle brings the carrying handle into the position shown in FIGURE 3, for example, from the position shown in FIGURE 2, the latch 38 which pivots rearwardly together with the carrying handle can, as shown in FIGURE 4, move out of the way via the bevelled surface of the hook-shaped projection 32 of the now stationary slide. In this way, the latch can assume the maximum deflection position behind the back of the hook-shaped projection, as shown in solid lines in FIGURE 4. The vertical position of the latch, shown in dashed lines in FIGURE 4, corresponds to the position shown in both FIGURES 1 and 2, and the latch therefore appears foreshortened.

If, on the other hand, the driver pulls the carrying handle 35 forward, that is, from the position shown in FIGURE 3 into the position shown in FIGURE 2, the latch 38, which is swung forward together with the carrying handle pushes the slide 31 forward into the position illustrated in FIGURE 2. During this forward movement, the lug 33 of the slide contacts the lever linkage 16 and 17 near the pivot pin 18 and pushes this set of levers forward. This movement causes the left end of the rod 19, which is fixedly connected with the upward end of the straight lever 17 and which is slidable in the slot-like guides 23, 24, to be forced upwardly until it reaches the upper end of the vertical section 24 which is also the rear end of the horizontal section 23. In a similar manner, the right end of the rod is moved upwardly by the right-hand set of levers 43 and 44; this movement of the rod 19, in a direction parallel to itself, into its highest position, results in the raising of the receiving means.

Upon reaching this upward position, the two tension springs 46 and 51 automatically jerk the two ejectors 25 and 26 forward and in this manner, the cartridge 1 is pushed out from the receiving means 2 by a certain distance. The position of the slide 31 shown in FIGURE 2, is the forwardmost position for this slide, because if the carrying handle 35 is swung forward somewhat more, the front side of the free end of the latch 38 comes out of engagement with the hook-like projection 32 of the slide and the slide is automatically moved into its rearward position under the influence of the return spring 34, as is shown in FIGURE 3. The position of the carrying handle which brings about the raising of the receiving means 2 and therefore the ejection of cartridge 1, is depicted in FIGURE 2, with the carrying handle being forwardly inclined by an angle of 60°. In order to couple the latch 38 and the slide 31, the driver of the motor vehicle has to pivot the carrying handle into the position shown in FIGURE 3, in which the carrying handle is inclined to the back of the device through a small angle. Thus, if the driver wants to exchange the cartridge, the driver only has to pivot the carrying handle through at most an angle of approximately 90°.

In accordance with a feature of the present invention, when the carrying handle 35 is swung forward into the horizontal position, the tape recorder may be pulled from its mounting below the dashboard and can then be carried by this handle for use in any other place.

When the tape recorded is in position, the operating knobs therefore, (not shown) are so closely positioned to the tape which runs near the rear edge of the cartridge, that these knobs project into the cartridge. In order to prevent the cartridge from being raised up and damaged by the pivoting of the carrying handle 35, there is provided at the upper surface of the chassis 20 a bar 40 which is displaceable in its longitudinal direction such that when the tape recorder is switched on by means of a switch (not shown), the bar is moved automatically to the left, that is, toward the slide 31.

The bar 40 has is left end portion 50, which points to the slide 31 bent in a right angle, this angle portion being in the same plane as the remainder of the bar and having a length, as shown in FIGURES 2 and 3, such that the bent portion 50 passes through a slit 52 in the upwardly-extending left edge of the chassis 20. When the switch is in the off position, the part occupies the position shown in solid lines in FIGURE 4. The bar 40, in this position, is not in contact with the latch 38 and the movability of the latch is not influenced by the bent portion 50 of the bar. The bar 40 is again shown in FIGURE 1 in the position which is occupied when the switch is off and, for this reason, the bent portion 50 is not visible.

In operation, when the switch is switched on, the bar 40 is thereby moved to the left with the bent portion 50, shown in dashed lines in FIGURE 4, lying so far to the left that it extends somewhat beyond the hook-like projection 32 of the slide 31. The bent portion 50 extends back to such an extent, that is, beyond the hook-like projection 32 of the slide 31 and is so limited outwardly, that when the switch is switched on the bar 40 is shifted to the left, the latch cannot reach the rear of the projection. Thus, the latch is forced slightly to the left by the bent portion 50 when the carrying handle 35 and therefore also the latch is forced slightly to the left by the bent portion 50 when the carrying handle 35 and therefore also the latch are moved from the position shown in FIGURES 1 and 2 to the position of FIGURE 3. In any event, when the switch is placed in the "on" position, the latch 38 cannot be brought into engagement with the slide 31 as a result of which, the receiving means together with the cartridge 1 cannot be raised up when the tape recorder is switched on.

It will thus be seen that, in accordance with the present invention, there is provided an arrangement in which the receiving means can be raised from its basic operating position by means of a lever which is actuatable from the outside, and ejector means which are provided within the receiving means and which are movable in the direction in which the carriage is inserted, which ejector means cause the receiving means to be lowered into the basic operating position in response to the insertion of the tape cartridge and force the cartridge a small distance out of the receiving means when such means are raised up.

Thus, all that the driver must do in order to exchange one tape cartridge for another, is to actuate but one lever, which can, of course, be sufficiently large so that the driver can grasp it and move it even when he wears gloves. The cartridge which has been ejected a small distance out of the receiving means can then be easily picked up. The fact that the insertion of the cartridge automatically lowers the receiving means into the basic operating position in which the driving means of a tape recorder comes into engagement with the centers of the tape reels, already simplifies the operation of the device. Thus, it now becomes unnecessary to raise the vertical axles of the driving means in order to operate the tape recorder, which, in turn, reduces the cost of building such a tape recorder.

It will also be seen that, in accordance with the present invention, a practical embodiment makes use of a pivotable carrying handle which simultaneously carries out the function of the actuable lever such that the pivoting of the carrying handle raises the receiving means.

Inasmuch as the tape recorder is to be used not only in the car, but also outside of the car, it simplifies the arrangement of the apparatus if the carrying handle is also used as the operating element by means of which the cartridge is exchanged.

It can also be seen from the above, that, in accordance with a further feature of the present invention, there is provided a latch which rotates together with the carrying handle, the latch being coupled with the slide which raises up the receiving means for initiating the upward movement of the receiving means.

Furthermore, a switch which is readily actuatable by the driver applies the operating voltages to the tape recorder and also brings the magnetic heads near the magnetic tape which is being unwound from the supply reel and being wound on the take-up reel. This type of an arrangement results, however, with the magnetic heads projecting into the cartridge, and in order to prevent the receiving means and the cartridge from being raised up while the heads are in this position, which could result in damage of the heads and of the cartridge, there is provided, in accordance with a further feature of the present invention an element for preventing the raising of the receiving means during operation of the tape recorder. This element being as described above, a bar, which when the tape recorder is activated coacts with the latch—which itself is coupled with the lever of the carrying handle—in such a manner that the slide cannot come into engagement therewith. Therefore the arrangement is such that the driver cannot, so long as the tape recorder is switched on and the magnetic heads are in their operative position, inadvertently remove the cartridge.

It will be understood that the above description of the present invention is susceptible to various modifications, changes and adaptations, and the same are intended to be comprehended within the meaning and range of equivalents of the appended claims.

What is claimed is:

1. A tape recorder having a housing and a driving means for a tape cartridge, said tape recorder comprising, in combination:

receiving means arranged horizontally with respect to said housing for receiving a tape cartridge in a lateral direction;

said receiving means being movable in the direction of movement of said cartridge from a first, raised, non-operative position to a second, lowered, operative position whereupon the centers of the tape cartridge reels are automatically coupled to the tape recorder driving means upon said receiving means reaching the second position;

at least one spring connected to said receiving means for biassing said receiving means into the second position;

actuating means on the outside of said receiving means and coupled thereto whereby said receiving means can be raised from said second position to said first position to allow the exchange of said tape cartridge for another;

linking means coupling said actuating means to said receiving means and responsive to said actuating means for holding said receiving means in the first position against the bias of said spring;

means connecting said receiving means to said spring for moving the receiving means to its second position when the cartridge is inserted into the receiving means; and means for ejecting the cartridge carried by the receiving means a certain distance out of said receiving means when the receiving means is moved to said first position by the operation of said actuating means.

2. A tape recorder as defined in claim 1 wherein said actuating means is a lever formed from a pivotable handle which is provided for carrying the apparatus and which simultaneously performs the function of said actuating means in that a pivoting of this carrying lever into a given position raises the receiving means.

3. A tape recorder as defined in claim 1 and said linking means further comprising at least one member being arranged within the housing and having a slot-like guide therein, said guide including a horizontal section and a vertical section the upper end of which joins the rear end of the horizontal section, rod means being secured to said ejector means and extending transversely to the direction in which the cartridge is inserted into the receiving means, said rod means being arranged below said receiving means and mounted for movement in said slot-like guide such that said spring pulls said receiving means down toward the rod means.

4. A tape recorder as defined in claim 2 said linking means further comprising at least one member being arranged within the housing and having a slot-like guide therein, said guide including a horizontal section and a vertical section the upper end of which joins the rear end of the horizontal section, rod means being secured to said ejector means and extending transversely to the direction in which the cartridge is inserted into the receiving means, said rod means being mounted for movement in said slot-like guide, a slide member being movable in the direction in which the cartridge is withdrawn, said linking means being coupled to said lever and a means being coupled to said lever for engaging said slide member when said lever is pivoted and for moving said slide member in such a manner that the slide member contacts said linking means and presses said rod means of said linking means upwardly in the vertical section of said slot-like guide.

5. A tape recorder as defined in claim 4 and further comprising a switch for the tape recorder and a bar member arranged within the housing, said bar member being actuated by said switch for contacting said means for engaging and moving so as to prevent said means for engaging and moving from coming into engagement with said slide.

6. A tape recorder as defined in claim 5 wherein said receiving means are provided with at least one downwardly extending member having a longitudinal slot therein, and further comprising guide means mounted within the housing and having tongue portions extending into said slot for guiding the movement of said receiving means between the lowered and raised positions.

7. A tape recorder as defined in claim 1 wherein said ejector means comprises a spring means for biassing said ejector means into the position wherein the cartridge carried by said receiving means is pushed a certain distance out of said receiving means.

8. A tape recorder as defined in claim 4, further comprising a spring coupled to said slide member for biassing said slide member into a position in which said slide member does not contact said linking means.

References Cited

UNITED STATES PATENTS

| | | | |
|---|---|---|---|
| 2,969,929 | 1/1961 | Rudzitis | 242—55.13 |
| 3,146,316 | 8/1964 | Knoth | 242—55.13 X |
| 3,167,267 | 1/1965 | Crane | 242—55.13 |
| 3,273,815 | 9/1966 | Schuller | 242—55.12 |

GEORGE F. MAUTZ, *Primary Examiner.*